US010579406B2

(12) United States Patent
Madapurath et al.

(10) Patent No.: US 10,579,406 B2
(45) Date of Patent: Mar. 3, 2020

(54) DYNAMIC ORCHESTRATION OF OVERLAY TUNNELS

(71) Applicant: AVAGO TECHNOLOGIES INTERNATIONAL SALES PTE. LIMITED, Singapore (SG)

(72) Inventors: Ritesh Madapurath, Bangalore (IN); Sachin Holla, Bangalore (IN); Manjunath A. G. Gowda, San Jose, CA (US); Sanjeev Joshi, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 221 days.

(21) Appl. No.: 15/091,319

(22) Filed: Apr. 5, 2016

(65) Prior Publication Data

US 2016/0299775 A1 Oct. 13, 2016

Related U.S. Application Data

(60) Provisional application No. 62/144,709, filed on Apr. 8, 2015.

(51) Int. Cl.
*G06F 9/455* (2018.01)
*H04L 12/46* (2006.01)
*H04L 12/715* (2013.01)

(52) U.S. Cl.
CPC ...... *G06F 9/45558* (2013.01); *H04L 12/4633* (2013.01); *H04L 12/4641* (2013.01); *G06F 2009/45595* (2013.01); *H04L 45/64* (2013.01)

(58) Field of Classification Search
CPC ....... G06F 9/45558; G06F 2009/45595; H04L 12/4633; H04L 45/64
See application file for complete search history.

(56) References Cited

U.S. PATENT DOCUMENTS

| 829,529 A | 8/1906 | Keathley |
| 2,854,352 A | 9/1958 | Gronemeyer |
(Continued)

FOREIGN PATENT DOCUMENTS

| CN | 1735062 | 2/2006 |
| CN | 1777149 | 5/2006 |
(Continued)

OTHER PUBLICATIONS

Office Action for U.S. Appl. No. 14/510,913, dated Jun. 30, 2017.
(Continued)

*Primary Examiner* — Hiren P Patel
*Assistant Examiner* — Jonathan R Labud
(74) *Attorney, Agent, or Firm* — Xsensus LLP

(57) ABSTRACT

One embodiment of the present invention provides a dynamic overlay tunnel orchestration system. During operation, the system detects the appearance of a first virtual machine running on a hypervisor of a first host machine coupled to a first switch in a network. The system identifies a first virtual local area network (VLAN) associated with the first virtual machine and determines whether an overlay tunnel exists between the first switch and a second switch coupling a second virtual machine belonging to the first VLAN. If no such overlay tunnel exists, the system generates an instruction for the first and second switches to establish a first overlay tunnel between the first and second switches.

18 Claims, 10 Drawing Sheets

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B1 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |

(56) References Cited

U.S. PATENT DOCUMENTS

| | | |
|---|---|---|
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copelandiii |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |

(56) References Cited

U.S. PATENT DOCUMENTS

| | | |
|---|---|---|
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |

(56) References Cited

U.S. PATENT DOCUMENTS

| | | |
|---|---|---|
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0240182 A1* | 9/2012 | Narayanaswamy .. G06F 9/5077 726/1 |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1* | 9/2013 | Koganti ................ H04L 49/356 370/390 |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |

(56) References Cited

U.S. PATENT DOCUMENTS

| | | | |
|---|---|---|---|
| 2013/0318219 A1* | 11/2013 | Kancherla | H04L 49/70 709/222 |
| 2013/0322427 A1 | 12/2013 | Stiekes | |
| 2013/0329605 A1 | 12/2013 | Nakil | |
| 2013/0332660 A1 | 12/2013 | Talagala | |
| 2013/0336104 A1 | 12/2013 | Talla | |
| 2013/0346583 A1 | 12/2013 | Low | |
| 2014/0013324 A1 | 1/2014 | Zhang | |
| 2014/0019608 A1 | 1/2014 | Kawakami | |
| 2014/0019639 A1 | 1/2014 | Ueno | |
| 2014/0025736 A1 | 1/2014 | Wang | |
| 2014/0029412 A1 | 1/2014 | Janardhanan | |
| 2014/0029419 A1 | 1/2014 | Jain | |
| 2014/0044126 A1 | 2/2014 | Sabhanatarajan | |
| 2014/0050223 A1 | 2/2014 | Foo | |
| 2014/0056298 A1 | 2/2014 | Vobbilisetty | |
| 2014/0059225 A1 | 2/2014 | Gasparakis | |
| 2014/0064056 A1 | 3/2014 | Sakata | |
| 2014/0071987 A1 | 3/2014 | Janardhanan | |
| 2014/0086253 A1 | 3/2014 | Yong | |
| 2014/0092738 A1 | 4/2014 | Grandhi | |
| 2014/0105034 A1 | 4/2014 | Huawei | |
| 2014/0112122 A1 | 4/2014 | Kapadia | |
| 2014/0140243 A1 | 5/2014 | Ashwood-Smith | |
| 2014/0157251 A1 | 6/2014 | Hooker | |
| 2014/0169368 A1 | 6/2014 | Grover | |
| 2014/0188996 A1 | 7/2014 | Lie | |
| 2014/0192804 A1 | 7/2014 | Ghanwani | |
| 2014/0195695 A1 | 7/2014 | Okita | |
| 2014/0201733 A1* | 7/2014 | Benny | G06F 9/455 718/1 |
| 2014/0241147 A1 | 8/2014 | Rajagopalan | |
| 2014/0258446 A1 | 9/2014 | Bursell | |
| 2014/0269701 A1 | 9/2014 | Kaushik | |
| 2014/0269709 A1 | 9/2014 | Benny | |
| 2014/0269720 A1 | 9/2014 | Srinivasan | |
| 2014/0269733 A1 | 9/2014 | Venkatesh | |
| 2014/0298091 A1 | 10/2014 | Carlen | |
| 2014/0355477 A1 | 12/2014 | Moopath | |
| 2014/0362854 A1 | 12/2014 | Addanki | |
| 2014/0362859 A1 | 12/2014 | Addanki | |
| 2015/0009992 A1 | 1/2015 | Zhang | |
| 2015/0010007 A1 | 1/2015 | Matsuhira | |
| 2015/0016300 A1 | 1/2015 | Devireddy | |
| 2015/0030031 A1 | 1/2015 | Zhou | |
| 2015/0092593 A1 | 4/2015 | Kompella | |
| 2015/0100958 A1* | 4/2015 | Banavalikar | G06F 9/45558 718/1 |
| 2015/0103826 A1 | 4/2015 | Davis | |
| 2015/0110111 A1 | 4/2015 | Song | |
| 2015/0110487 A1 | 4/2015 | Fenkes | |
| 2015/0117256 A1 | 4/2015 | Sabaa | |
| 2015/0117454 A1 | 4/2015 | Koponen | |
| 2015/0127618 A1 | 5/2015 | Alberti | |
| 2015/0139234 A1 | 5/2015 | Hu | |
| 2015/0143369 A1 | 5/2015 | Zheng | |
| 2015/0172098 A1 | 6/2015 | Agarwal | |
| 2015/0188753 A1 | 7/2015 | Anumala | |
| 2015/0188770 A1 | 7/2015 | Naiksatam | |
| 2015/0195093 A1 | 7/2015 | Ramasubramani | |
| 2015/0222506 A1 | 8/2015 | Kizhakkiniyil | |
| 2015/0248298 A1 | 9/2015 | Gavrilov | |
| 2015/0263897 A1 | 9/2015 | Ganichev | |
| 2015/0263899 A1 | 9/2015 | Tubaltsev | |
| 2015/0263991 A1 | 9/2015 | MacChiano | |
| 2015/0281066 A1 | 10/2015 | Koley | |
| 2015/0301901 A1 | 10/2015 | Rath | |
| 2015/0347468 A1 | 12/2015 | Bester | |
| 2016/0072899 A1 | 3/2016 | Tung | |
| 2016/0087885 A1 | 3/2016 | Tripathi | |
| 2016/0139939 A1 | 5/2016 | Bosch | |
| 2016/0182458 A1 | 6/2016 | Shatzkamer | |
| 2016/0188527 A1* | 6/2016 | Cherian | H04L 45/74 709/212 |
| 2016/0212040 A1 | 7/2016 | Bhagavathiperumal | |
| 2016/0344640 A1 | 11/2016 | Söderlund | |
| 2017/0012880 A1 | 1/2017 | Yang | |
| 2017/0026197 A1 | 1/2017 | Venkatesh | |
| 2017/0097841 A1 | 4/2017 | Chang | |
| 2017/0223756 A1* | 8/2017 | Sebastian | H04W 76/021 |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.

(56) References Cited

OTHER PUBLICATIONS

Office Action dated Feb. 8, 2017, U.S. Appl. No. 14/822,380, filed Aug. 10, 2015.
Office Action for U.S. Appl. No. 13/288,822, dated May 26, 2017.
Office Action for U.S. Appl. No. 14/329,447, dated Jun. 8, 2017.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:flp://ftp.isi.edu/in-notes/rfc2338.txt [retrieved on Apr. 10, 2000].
Office Action dated Jun. 18, 2015, U.S. Appl. No. 13/098,490, filed May 2, 2011.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Servicee Center, Piscataway, US, vol. 42, No. 6, Jun. 1, 2004 (Jun. 1, 2004), pp. 124-131, XP001198207, ISSN: 0163-8604, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils' The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over I ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No., 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.

(56) References Cited

OTHER PUBLICATIONS

Office Action for U.S. Appl. No, 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.

(56) References Cited

OTHER PUBLICATIONS

Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015 U.S. Appl. No. 13/656,438 filed Oct. 19, 2012.
Office Action dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

(56) References Cited

OTHER PUBLICATIONS

Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.
Extended European Search Report dated Nov. 29, 2018 in European Application No. 16777296.1-1224.
Bhumip Khasnabish ZTE USA et al: "Mobility and Interconnection of Virtual Machines and Virtual Network Elements; draft-khasnabish-vmmi-problems-03.txt", Internet Engineering Task Force, IETF; Standard Working Draft, Internet Society (ISOC) 4, (Dec. 30, 2012), pp. 1-29, XP015089268.

\* cited by examiner

DYNAMIC ORCHESTRATION OF OVERLAY TUNNELS

RELATED APPLICATIONS

This application claims the benefit of U.S. Provisional Application No. 62/144,709, titled "Method and Apparatus for Dynamic Orchestration of NVE Overlay Transport" by inventors Ritesh Madapurath, Sachin Hollai, Manjunath A. G. Gowda, and Sanjeev Joshi, filed 8 Apr. 2015, the disclosure of which is incorporated by reference herein.

The present disclosure is related to U.S. Pat. No. 8,867,552, titled "Virtual Cluster Switching," by inventors Suresh Vobbilisetty and Dilip Chatwani, issued 21 Oct. 2014, the disclosure of which is incorporated by reference herein.

BACKGROUND

Field

This disclosure relates to communication networks. More specifically, this disclosure relates to a system and method for dynamically establishing overlay tunnels.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate a plurality of tenant networks. Since Internet traffic is becoming more diverse, network virtualization is becoming progressively more important as a value proposition for network architects. In addition, the evolution of virtual computing has made multi-tenancy attractive and, consequently, placed additional requirements on the network. For example, virtual servers are being allocated to a large number of tenants while a respective tenant operates multiple virtualized networks. It is often desirable that the network infrastructure can provide a large number of virtualized networks to support multi-tenancy and ensure network separation among the tenants.

A flexible way of implementing network virtualization and multi-tenancy is using overlay networks for extending a tenant network. Network virtualization edge is a network entity that implements network virtualization functions. Typically, the network virtualization edge is implemented in host machines, which host virtualized servers (e.g., virtual machines). However, the number of virtualized networks cannot grow infinitely in a host machine. It is limited by processing capacity and design complexity, to name a few factors. Furthermore, host machines with higher capability are usually more complex and expensive. More importantly, host machines often cannot provide large number of virtualized networks due to the limited capability of a virtualization manager (e.g., a hypervisor running the virtual machines).

While network virtualization supports many desirable features, some issues remain unsolved in efficiently facilitating virtualized networks for multiple tenants.

SUMMARY

One embodiment of the present invention provides a dynamic overlay tunnel orchestration system. During operation, the system detects the appearance of a first virtual machine running on a hypervisor of a first host machine coupled to a first switch in a network. The system identifies a first virtual local area network (VLAN) associated with the first virtual machine and determines whether an overlay tunnel exists between the first switch and a second switch coupling a second virtual machine belonging to the first VLAN. If no such overlay tunnel exists, the system generates an instruction for the first and second switches to establish a first overlay tunnel between the first and second switches.

In a variation on this embodiment, the system allocates a network identifier for the first VLAN. The network identifier indicates traffic belonging to the first VLAN in the first overlay tunnel.

In a further variation, the system maintains a mapping between the first VLAN and a tuple comprising the first overlay tunnel and the network identifier.

In a variation on this embodiment, the system refrains from instructing the first and second switches to establish the first overlay tunnel in response to determining that an overlay tunnel exists between the first and second switches.

In a variation on this embodiment, the system detects the removal of the first virtual machine from the first host machine and determines whether the first overlay tunnel provides an overlay service to the first and second switches. If the first overlay tunnel does not provide an overlay service, the system generates an instruction for the first and second switches to terminate the first overlay tunnel between the first and second switches.

In a further variation, determining whether the first overlay tunnel provides an overlay service to the first and second switches includes one or more of: determining whether the first overlay tunnel carries traffic belonging to a second VLAN, and determining whether a third virtual machine belonging to the first VLAN is running on the hypervisor of the first host machine.

In a further variation, the removal of the first virtual machine includes: migration of the first virtual machine; and deletion of the first virtual machine.

In a variation on this embodiment, the system obtains information associated with the first virtual machine from a notification message from a notification agent in the hypervisor of the first host machine.

One embodiment of the present invention provides a switch. The switch includes a storage device, a tunnel management module, and a mapping module. During operation, the tunnel management module establishes an overlay tunnel with a second switch based on a first instruction identifying the tunnel endpoint switches of the overlay tunnel. The mapping module maintains, in the storage device, a mapping between a first tuple and a second tuple. The first tuple includes a media access control (MAC) address and a virtual local area network (VLAN) identifier of a virtual machine. The second tuple includes the overlay tunnel and a network identifier. The network identifier indicates traffic belonging to the VLAN in the overlay tunnel.

In a variation on this embodiment, the virtual machine is coupled to the second switch. The first instruction includes the VLAN identifier, the overlay tunnel, and the network identifier.

In a variation on this embodiment, the switch further includes a forwarding module, which encapsulates a packet in a tunnel encapsulation header associated with the overlay tunnel based on the mapping. The tunnel encapsulation header includes the network identifier.

In a variation on this embodiment, the tunnel management module terminates the overlay tunnel with the second switch based on a second instruction identifying tunnel endpoint switches for the overlay tunnel.

BRIEF DESCRIPTION OF THE FIGURES

In the figures, like reference numerals refer to the same figure elements.

DETAILED DESCRIPTION

Figure 1A:
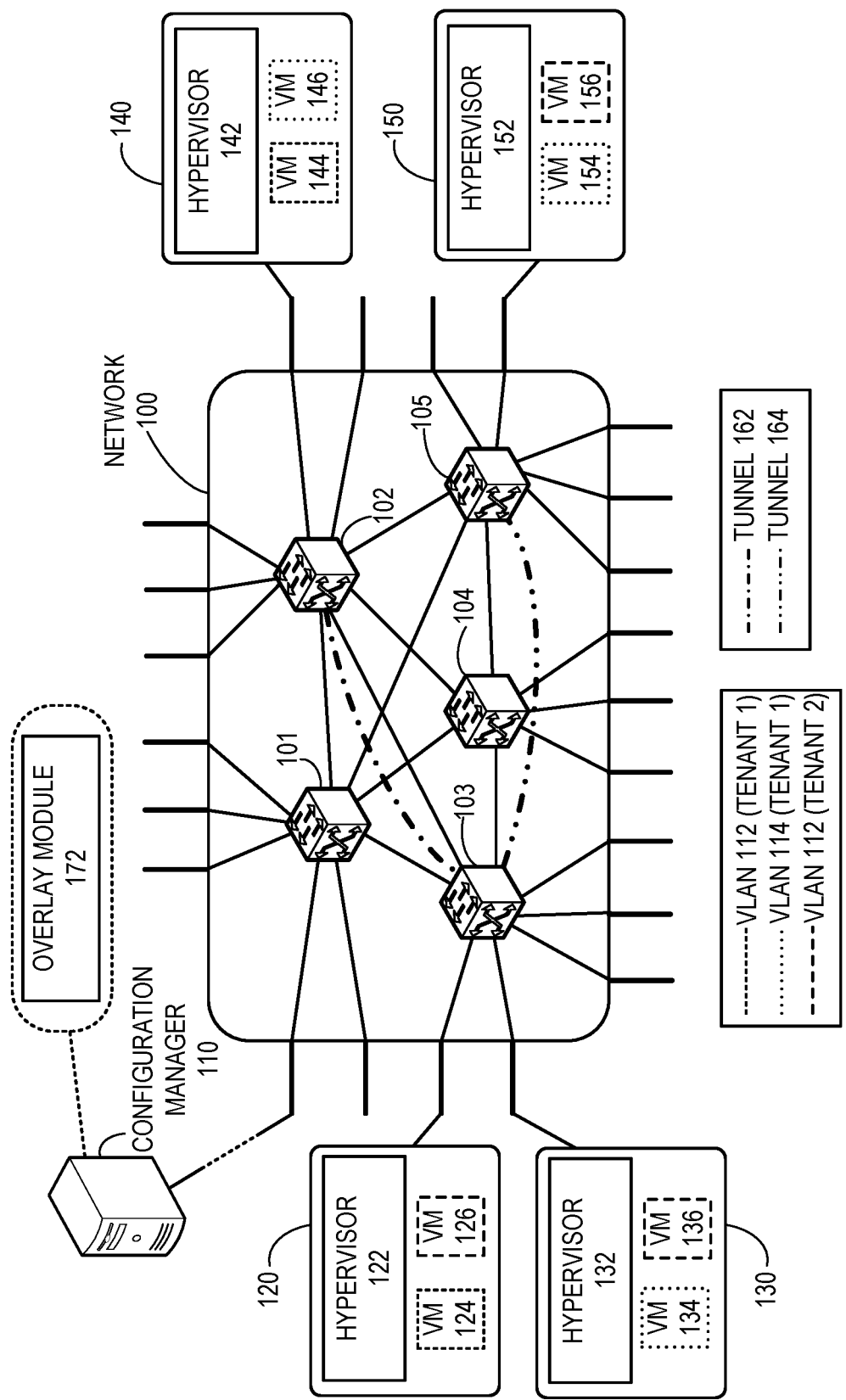
FIG. 1A illustrates an exemplary network with support for dynamic orchestration of overlay tunnels, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently facilitating overlay tunnels for virtual machines in a network is solved by dynamically orchestrating an overlay tunnel between switch pairs coupling virtual machines belonging to the same layer-2 broadcast domain (e.g., the same virtual local area network (VLAN)). Examples of a tunnel include, but are not limited to, Virtual Extensible Local Area Network (VXLAN); Generic Routing Encapsulation (GRE); and GRE variants, such as Network Virtualization using GRE (NVGRE) and openvSwitch GRE.

Suppose that two virtual machines residing on two different host machines belong to a same VLAN but are separated by a network (e.g., a layer-3 network). With existing technologies, the virtualization managers (e.g., hypervisors and Hyper-Vs) running the virtual machines establish an overlay tunnel to extend the VLAN across the network. However, the capacity of a virtualization manager is limited by the processing capacity of the host machine hosting the virtualization manager and the virtual machines. To overcome such limitations, the responsibilities of managing and maintaining overlay tunnels can be offloaded to the switches of the network. In traditional overlay networks, the orchestration of overlay tunnels among the switches are static and pre-determined based on the network architecture. The switches are configured to establish the overlay tunnels between a respective switch pair in the network during the boot up process. These tunnels typically do not change, even when new virtual machines are added or existing ones are removed or migrated.

To solve this problem, since the overlay tunnels are managed by the switches, the responsibilities of encapsulating and decapsulating packets with tunnel headers is offloaded from the virtualization managers to the switches. In some embodiments, the switches use switch modules (e.g., switch hardware) to manage the tunnels. As a result, the switches can encapsulate and decapsulate packets more efficiently than the virtualization managers.

In addition, an overlay module running on a configuration manager can collect information about appearance and removal of virtual machines on the virtualization managers. For example, a virtualization manager can include a notification agent, which provides the information to the overlay module. Based on this information, the overlay module dynamically determines whether to establish or terminate a tunnel between a switch pair. The overlay module determines the necessity of an overlay tunnel based on the lifecycle of the virtual machines. The overlay module establishes an overlay tunnel between any two switches when both switches are coupled to virtual machines requiring overlay services (e.g., virtual machines belonging to a same VLAN). The overlay module removes a tunnel when a virtual machine no longer requires the services provided by the overlay tunnel (e.g., when a virtual machine is removed).

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an IP routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "hypervisor" is used in a generic sense, and can refer to any virtualization manager (e.g., a virtual machine manager). Any software, firmware, or hardware that creates and runs virtual machines can be a "hypervisor." The term "virtual machine" is also used in a generic sense and can refer to software implementation of a machine or device. Any virtual device which can execute a software program similar to a physical device can be a "virtual machine."

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with support for dynamic orchestration of overlay tunnels, in accordance with an embodiment of the present invention. As illustrated in FIG. 1A, a network 100 includes member switches 101, 102, 103, 104, and 105. Network 100 can be a TRILL network and a respective member switch, such as switch 105, can be a TRILL RBridge. Network 100 can also be an IP network and a respective member switch, such as switch 105, can be an IP-capable switch, which calculates and maintains a local IP routing table (e.g., a routing information base or RIB), and is capable of forwarding packets based on its IP addresses. In some embodiments, network 100 is a fabric switch, and one or more switches in fabric switch 100 can be virtual switches (e.g., a software switch running on a computing device).

Switch 103 is coupled to end devices 120 and 130. Switches 102 and 105 are coupled to end devices 140 and 150, respectively. End devices 120, 130, 140, and 150 are host machines, each hosting a plurality of virtual machines. Switches in network 100 use edge ports to communicate with end devices and inter-switch ports to communicate with other switches. For example, switch 103 is coupled to end devices, such as end device 120, via edge ports and to switches 101, 102, and 104 via inter-switch ports. End devices 120, 130, 140, and 150 include hypervisors 122, 132, 142, and 152, respectively. Virtual machines (VMs) 124 and 126 run on hypervisor 122; virtual machines 134 and 136 run on hypervisor 132; virtual machines 144 and 146 run on hypervisor 142; and virtual machines 154 and 156 run on hypervisor 152.

In this example, virtual machines 124, 134, 144, 146, and 154 belong to a tenant 1 and virtual machines 126, 136, and 156 belong to a tenant 2. Tenant 1 deploys VLANs 112 and 114, and tenant 2 deploys VLAN 112. Hence, the same VLAN identifier for VLAN 112 can be used by multiple tenants. Virtual machines 124 and 144 are in VLAN 112 of tenant 1, virtual machines 134, 146, and 154 are in VLAN 114 of tenant 1, and virtual machines 126, 136, and 156 are in VLAN 112 of tenant 2. Since network 100 is serving a plurality of tenants, each deploying a plurality of VLANs, a respective switch of network 100 can serve both tenants 1 and 2, and a plurality of switches can serve the same tenant 1 or 2.

With existing technologies, since virtual machines 124 and 144 belong to a same VLAN 112 but are separated by network 100, hypervisors 122 and 142 establish an overlay tunnel to extend VLAN 112 across network 100. However, the capacity of hypervisors 122 and 142 is limited by the processing capacity of host machines 120 and 140, respectively. To overcome such limitations, the responsibilities of managing and maintaining overlay tunnels can be offloaded to the switches. In traditional overlay networks, the switches of network 100 are configured to establish the overlay tunnels between a respective switch pair in network 100 during the boot up process. These tunnels typically do not change, even when new virtual machines are added or existing ones are removed or migrated.

To solve this problem, an end device 110 operating as a configuration manager can dynamically orchestrate overlay tunnels in network 100 between switches coupling virtual machines belonging to the same VLAN. These switches can be referred to as tunnel endpoints. A tunnel is identified by the switch identifiers (e.g., IP addresses) of the tunnel endpoints. Configuration manager 110 can be an administrator device from which network 100 can be configured. End device 110 can be coupled with network 100 via one or more links (denoted with a dashed line) of one or more networks. Since the responsibility of managing overlay tunnels is offloaded to the switches of network 100, the responsibilities of encapsulating and decapsulating packets with tunnel headers is offloaded from hypervisors to the switches in network 100. In some embodiments, the switches use switch hardware to manage the tunnels. As a result, the switches can encapsulate and decapsulate packets more efficiently than the hypervisors.

In some embodiments, an overlay module 172 running on configuration manager 110 can collect information about appearance and removal of virtual machines. For example, when virtual machines 124 and 144 are created (or instantiated) on hypervisors 122 and 142, overlay module 172 collects this information. Based on this information, overlay module 172 determines that virtual machines 124 and 144 belong to a same VLAN 112 of tenant 1. As a result, overlay module 172 dynamically determines to establish an overlay tunnel between switches 102 and 103. Overlay module 172 sends a control message to switches 102 and 104 instructing them to establish an overlay tunnel. Upon receiving the control message, switches 102 and 103 establish a tunnel 162 (e.g., a VXLAN tunnel) between them.

In the same way, overlay module 172 determines that virtual machines 134 and 154 belong to a same VLAN 114 of tenant 1. Hence, based on an instruction from overlay module 172, switches 103 and 105 establish a tunnel 164 between them. This instruction includes the identifying information of switches 103 and 105. Furthermore, since switch 102 is coupled to a virtual machine 146 belonging to VLAN 114 of tenant 1, switches 102 and 103 use an already established tunnel 162 to carry traffic of VLAN 114. In the same way, overlay module 172 determines that virtual machines 126, 136, and 156 belong to a same VLAN 112 of tenant 2. Switches 103 and 105 then use already established tunnel 164 to carry traffic of VLAN 112 of tenant 2. Hence, the same tunnel can be used to carry traffic of different tenants. In this example, since switches 102 and 105 don't share a layer-2 broadcast domain, overlay module 172 determines that switches 102 and 105 may not need an overlay tunnel to forward traffic between host machines 140 and 150.

It should be noted that even though the same tunnel 162 can carry traffic of both VLANs 112 and 114 of tenant 1, these VLANs can use separate network identifiers (e.g., VXLAN Network Identifiers or VNIs). In other words, packets encapsulated with tunnel encapsulation headers carry different network identifiers for packets of VLANs 112 and 114. In the same way, even though the same tunnel 164 can carry traffic of both VLAN 114 of tenant 1 and VLAN 112 of tenant 2, these VLANs use separate network identifiers. The use of separate network identifiers allows the switches to use the same tunnel and maintain VLAN separations.

Overlay module 172 determines the necessity of overlay tunnel 162 based on the lifecycle of virtual machines coupled to switches 102 and 103. Suppose that virtual machines 144 and 146 are not coupled with switch 102 (e.g., due to a migration or a removal). Overlay module 172 determines that switch 102 does not have any virtual machine coupled with it. As a result, overlay module 172 terminates tunnel 162 since virtual machines 144 and 146 no longer require the services provided by overlay tunnel 162, such as extending VLANs 112 and 114 of tenant 1 across network 100.

Figure 1B:
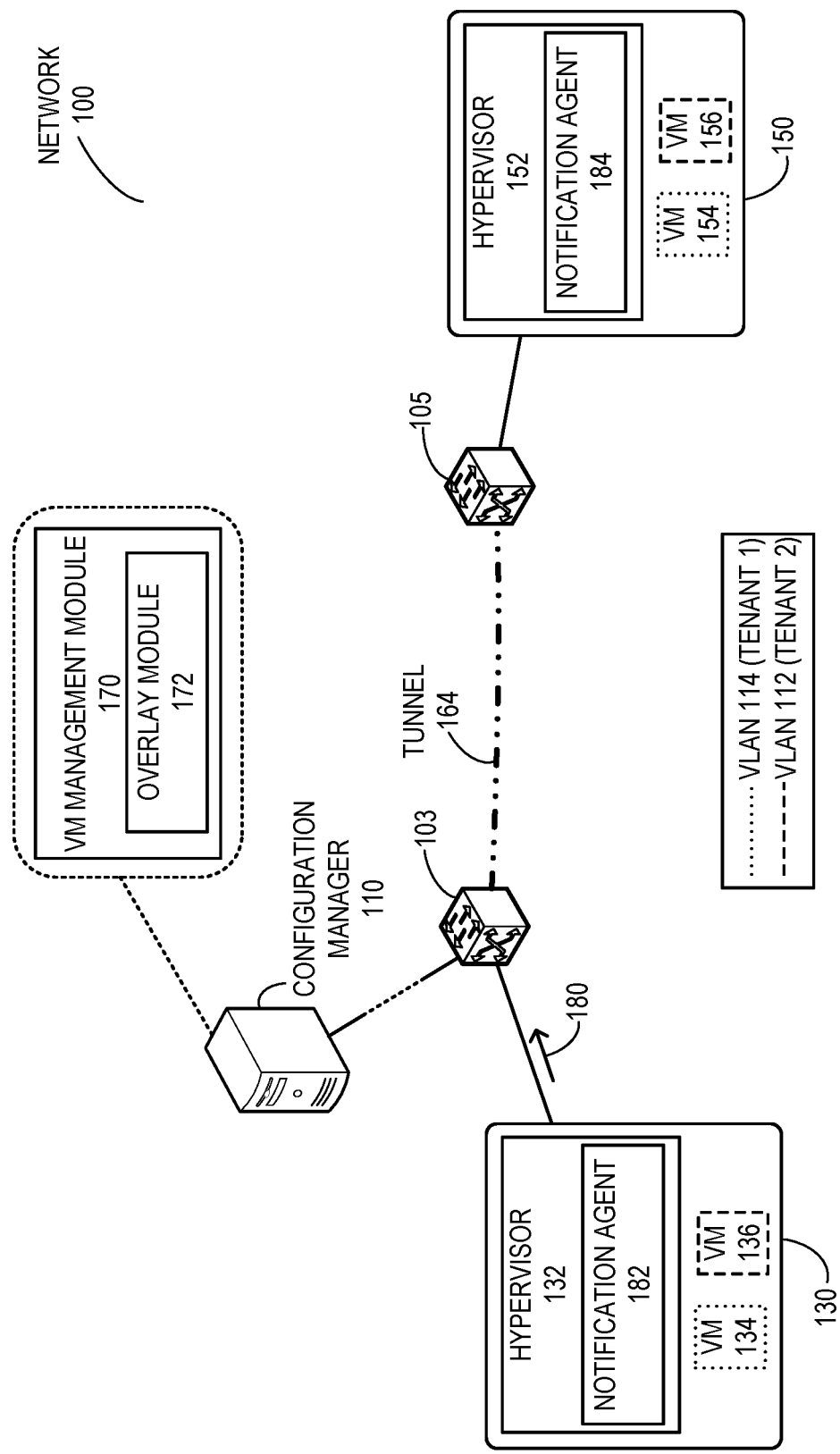
FIG. 1B illustrates an exemplary facilitation of dynamic orchestration of overlay tunnels, in accordance with an embodiment of the present invention.

FIG. 1B illustrates an exemplary facilitation of dynamic orchestration of overlay tunnels, in accordance with an embodiment of the present invention. In this example, configuration manager 110 runs a virtual machine management module 170. In some embodiments, virtual machine management module 170 is a cloud networking controller (e.g., OpenStack Neutron). Virtual machine management module 170 can provide flow definitions to the switches of network 100 (e.g., flow definitions in a software-defined network). The switches in network 100 can process packets based on the flow definition. Virtual machine management module 170 can include one or more application program interfaces (APIs), plug-ins, and authentication/authorization control modules that facilitates orchestration of virtual machines. Overlay module 172 can be a plug-in running on virtual machine management module 170.

To facilitate information to virtual machine management module 170, hypervisors 132 and 152 run notification agents 182 and 184, respectively. In some embodiments, notification agents 182 and 184 facilitate a messaging architecture (e.g., OpenStack Nova) for virtual machine management module 170 and can send messages to virtual machine management module 170 regarding appearance and removal of virtual machines on hypervisors 132 and 152, respectively. When virtual machine management module 170 receives such messages, overlay module 172 obtains the information provided in the messages. It should be noted that overlay module 172 only obtains information regarding the virtual machines from virtual machine management module 170. The overlay tunnel orchestration facilitated by overlay module 172 can be a capability independent of the native capabilities of virtual machine management module 170.

In addition, when a virtual machine is added to or removed from host machine 130, hypervisor 132 sends a discovery message 180 to switch 103. In this way, switch 103 identifies the media access control (MAC) address of the virtual machine. In some embodiments, discovery message 180 is based on a Link Layer Discovery Protocol (LLDP). Switch 103 can further construct a notification message indicating that switch 103 has learned the MAC addresses of virtual machines 134 and 136 and sends the notification message to switch 105. In this way, switch 105 determines that virtual machines 134 and 136 are reachable via switch 103. In the same way, switch 105 discovers appearance or removal of a virtual machine in host machine 150 and shares the information with switch 103.

Based on the information provided by notification agents 182 and 184, overlay module 172 dynamically determines whether to establish or terminate a tunnel between a switch pair. During operation, notification agent 182 detects that a virtual machine 124 has appeared in host machine 120. Notification agent 182 then sends a message comprising the virtual MAC address and VLAN 114 of virtual machine 124 to virtual machine management module 170. When the message reaches virtual machine management module 170, overlay module 172 obtains the information. Overlay module 172 determines that there is no other virtual machine in VLAN 114 of tenant 1 coupled with network 100. However, when virtual machine 154 appears in host machine 150, overlay module 172 obtains the MAC address and VLAN 114 of virtual machine 154. Overlay module 172 determines that both virtual machines 124 and 154 belong to the same VLAN 114 of tenant 1.

Based on this information, overlay module 172 determines that host machine 120 is coupled to switch 103 and host machine 150 is coupled to switch 105. Overlay module 172 generates a notification message instructing switches 103 and 105 to establish an overlay tunnel. In some embodiments, an overlay tunnel formation is disabled for hypervisors 122 and 152 (e.g., by an administrator). This allows a hypervisor to forward a layer-2 frame to a switch. Overlay module 172 can assign a network identifier for VLAN 114 of tenant 1, maintain a mapping between them, and send the mapping to switches 103 and 105. Upon receiving the instruction, switches 103 and 105 establish tunnel 164 between them.

On the other hand, when virtual machines 126 and 156 are created, notification agents 182 and 184, respectively, notify virtual machine management module 170. Overlay module 172 obtains the information regarding virtual machines 126 and 156, and determines that virtual machines 126 and 156 belong to VLAN 112 of tenant 2. Overlay module 172 determines that since tunnel 164 has already been established between switches 103 and 105, another tunnel is not needed to forward packets between hypervisors 122 and 124.

To forward a packet to virtual machine 154, virtual machine 124 provides the packet to hypervisor 122, which in turn, forwards the packet to switch 103. Switch 103 encapsulates the packet in a tunnel encapsulation header, includes the network identifier in the encapsulation header, and forwards the encapsulated packet to switch 105 via tunnel 164. The network identifier allows separation of traffic in network 100 between VLAN 114 of tenant 1 and VLAN 112 of tenant 2.

Tunnel Mapping

Figure 2:
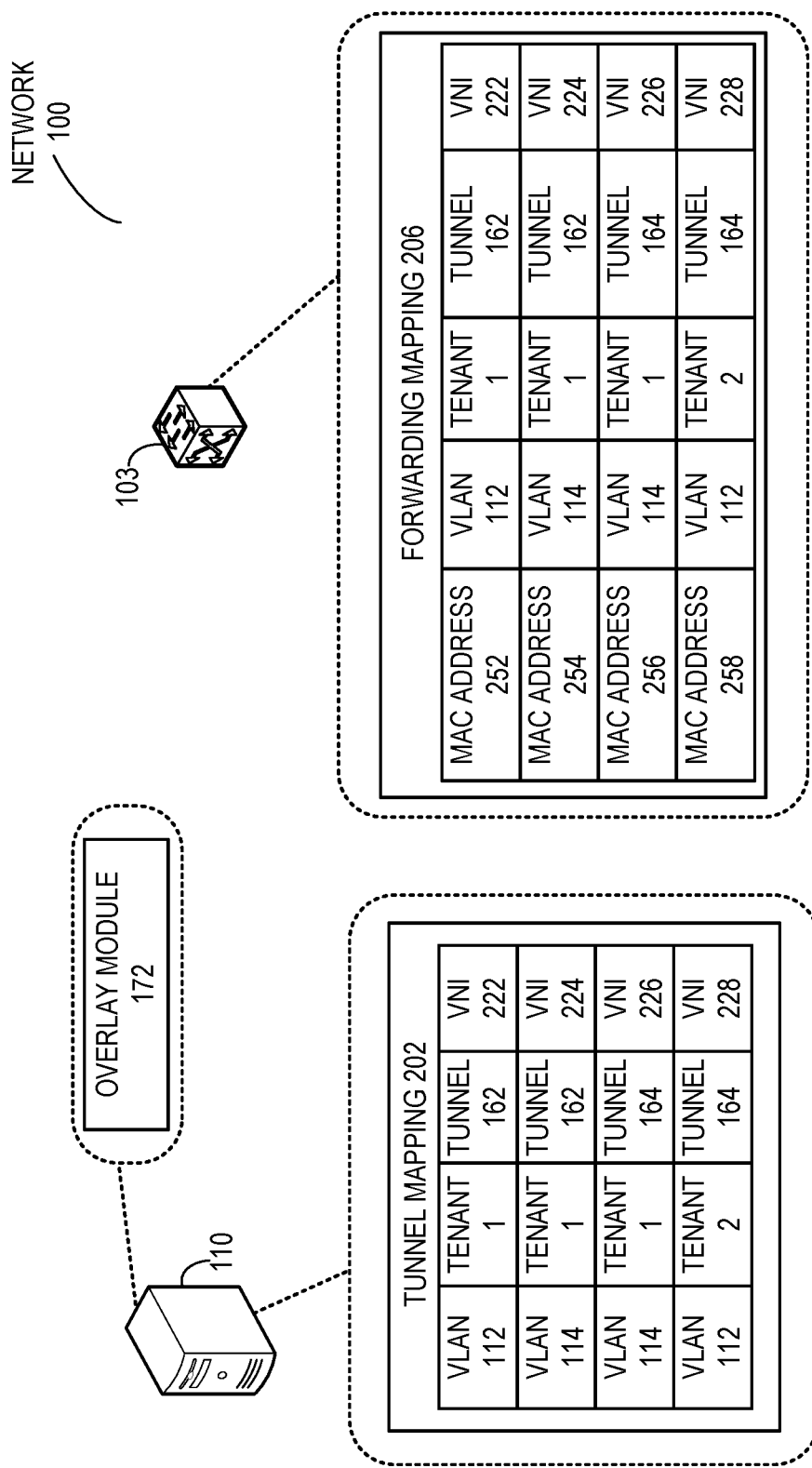
FIG. 2 illustrates exemplary mappings for facilitating dynamic orchestration of overlay tunnels, in accordance with an embodiment of the present invention.

FIG. 2 illustrates exemplary mappings for facilitating dynamic orchestration of overlay tunnels, in accordance with an embodiment of the present invention. During operation, overlay module 172 discovers information associated with a respective virtual machine coupled to network 100. Discovery information for a virtual machine includes a MAC address and a VLAN. Overlay module 172 allocates a network identifier (e.g., a VNI) for a respective VLAN so that a respective VLAN can be uniquely identified in an overlay tunnel. Overlay module 172 maintains a tunnel mapping comprising the tunnel, the VNI, and the VLAN information. The VLAN information includes a VLAN, which is identified by a VLAN identifier (e.g., an Institute of Electrical and Electronics Engineers (IEEE) 802.1Q VLAN tag or its variation), and a tenant of the VLAN. A tenant can be identified in the mapping based on one or more of: a tenant identifier, an ingress port, an egress port, and an IP subnet.

For example, since tunnel 162 carries traffic belonging to VLAN 112 of tenant 1, overlay module 172 maintains a tunnel mapping 202, which maps VLAN 112 and tenant 1 to tunnel 162 and a VNI 222 allocated for VLAN 112 of tenant 1. In tunnel mapping 202, tunnel 162 is identified by switch identifiers of the tunnel endpoints of tunnel 162. In other words, tunnel mapping 202 maps a tuple comprising VLAN 112 and tenant 1 to another tuple comprising tunnel 162 and VNI 222. Similarly, since tunnel 162 also carries traffic belonging to VLAN 114 of tenant 1, tunnel mapping 202 further maps VLAN 114 and tenant 1 to tunnel 162 and a VNI 224 allocated for VLAN 114 of tenant 1. VNIs 222 and 224 distinguish traffic belonging to VLANs 112 and 114, respectively, in tunnel 162. Tunnel mapping 202 allows the same tunnel 162 to carry traffic of both VLANs 112 and 114 of tenant 1 by using VNIs 222 and 224, respectively, in the tunnel encapsulation header (e.g., a VXLAN header).

In the same way, since tunnel 164 carries traffic belonging to VLAN 114 of tenant 1, tunnel mapping 202 further maps VLAN 114 and tenant 1 to tunnel 164 and a VNI 226 allocated for VLAN 114 of tenant 1. Similarly, since tunnel 164 also carries traffic belonging to VLAN 112 of tenant 2, tunnel mapping 202 further maps VLAN 112 and tenant 2 to tunnel 164 and a VNI 228 allocated for VLAN 112 of tenant 2. VNIs 226 and 228 distinguish traffic belonging to VLAN 114 of tenant 1 and VLAN 112 of tenant 2, respectively, in tunnel 164. It should be noted that overlay module 172 allocates both VNIs 224 and 226 for VLAN 114 of tenant 1, but for tunnels 162 and 164, respectively. In some embodiments, VNIs 224 and 226 have the same identifier value.

Overlay module 172 constructs a notification message comprising tunnel mapping 202 and sends the notification message to a switch, such as switch 103, in network 100. In some embodiments, overlay module 172 only includes the mapping of the tunnels for which switch 103 is a tunnel endpoint (i.e., the tunnels initiated or terminated at switch 103) in the notification message. When switch 103 learns a MAC address of a remote virtual machine, which is not coupled to switch 103, switch 103 creates a forwarding mapping 206 for that MAC address.

Suppose that MAC addresses 252, 254, 256, and 258 belong to virtual machines 144, 146, 154, and 156, respectively. When switch 103 learns MAC address 252 (e.g., either from a local port or from a notification message from switch 102), switch 103 determines that virtual machine 144 belongs to VLAN 112 of tenant 1. Based on the mappings received from overlay module 172, switch 103 creates an entry in forwarding mapping 206 for MAC address 252. Since tunnel 162 carries traffic from switch 103 to virtual machine 144, forwarding mapping 206 maps MAC address 252, VLAN 112, and tenant 1 to tunnel 162 and VNI 222 based on the mappings received from overlay module 172. In other words, tunnel mapping 206 maps a tuple comprising MAC address 252, VLAN 112, and tenant 1 to another tuple comprising tunnel 162 and VNI 222.

In the same way, forwarding mapping 206 maps MAC address 254, VLAN 114, and tenant 1 to tunnel 162 and VNI 224; MAC address 256, VLAN 114, and tenant 1 to tunnel 164 and VNI 226; and MAC address 258, VLAN 112, and tenant 2 to tunnel 164 and VNI 228. Forwarding mapping 206 allows switch 103 to determine which tunnel and VNI to use for forwarding packets via the overlay tunnels. Since a tunnel is identified based on the switch identifiers (e.g., IP addresses) of the tunnel endpoints, switch 103 can determine the destination address for a tunnel encapsulation header from forwarding mapping 206.

For example, upon receiving a packet destined to virtual machine 156 from virtual machine 136, switch 103 obtains forwarding information from forwarding mapping 206. Switch 103 encapsulates the packet with a tunnel encapsulation header, sets the source and destination addresses of the encapsulation header as the switch identifiers (e.g., IP addresses) of switches 103 and 105, respectively, and includes VNI 228 as the network identifier of the encapsulation header. Switch 103 can obtain an egress port for the encapsulated packed based on the destination address of the encapsulation header and transmit the packet via the egress port.

Tunnel Termination

Figure 3:
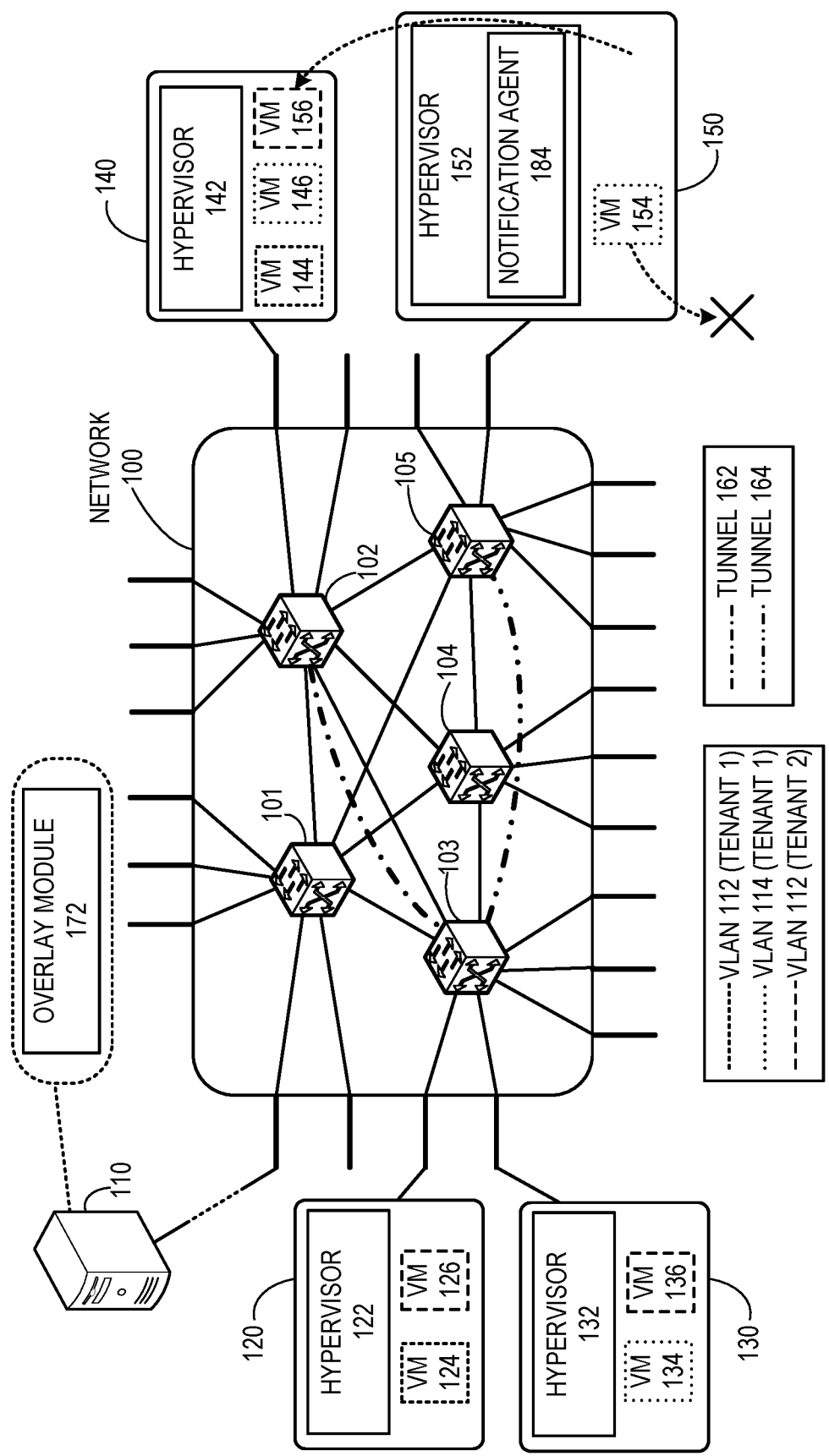
FIG. 3 illustrates an exemplary termination of a tunnel based on dynamic orchestration of overlay tunnels, in accordance with an embodiment of the present invention.

Overlay module 172 determines the necessity of an overlay tunnel based on the lifecycle of the virtual machines. Hence, overlay module 172 removes a tunnel when a virtual machine no longer requires the services provided by the overlay tunnel (e.g., when a virtual machine is removed). FIG. 3 illustrates an exemplary termination of a tunnel based on dynamic orchestration of overlay tunnels, in accordance with an embodiment of the present invention. During operation, virtual machine 156 migrates to host machine 140 (denoted with a dotted arrow) and starts running on hypervisor 142. Virtual machine 156 then becomes coupled to switch 102 but still remains in VLAN 112 of tenant 2.

Overlay module 172 obtains this information from notification agent 184. Overlay module 172 determines virtual machine 156 to be a new virtual machine running on hypervisor 142 and determines whether to establish a tunnel to accommodate the new virtual machine. Since virtual machines 126 and 136 are coupled to switch 103 and in VLAN 112 of tenant 2, tunnel 162 can carry traffic between migrated virtual machine 156 and virtual machine 126 (or 136). To facilitate this, in some embodiments, overlay module 172 updates tunnel mapping 202 to map VLAN 112 and tenant 2 to tunnel 162 and VNI 228, thereby associating VNI 228 with tunnel 162. Overlay module 172 can provide this updated information to switch 102.

Overlay module 172 then checks whether tunnel 164 is needed to forward traffic. Overlay module 172 determines that host machine 150 is still hosting virtual machine 154. As a result, the packets between virtual machines 134 and 154, which belong to the same VLAN 112 of tenant 2, are still forwarded via tunnel 164. Hence, overlay module 172 determines that tunnel 164 is needed to forward traffic. Switches 103 and 105 thus continue to maintain tunnel 164 between them. In this way, overlay module 172 ensures that even when a virtual machine migrates, the associated overlay tunnel continues carry traffic if another virtual machine needs the overlay tunnel.

Suppose that virtual machine 154 is removed (denoted with a cross). Overlay module 172 obtains this information from notification agent 184 and determines that host machine 150 is not hosting any virtual machine that needs an overlay tunnel. As a result, overlay module 172 determines that tunnel 164 is not needed to forward traffic. Overlay module 172 then generates a notification message instructing to terminate tunnel 164 and sends the notification message to switches 103 and 105. Upon receiving the notification message, switches 103 and 105 terminate tunnel 164, thereby removing an unused overlay tunnel from network 100.

Operations of an Overlay Module

Figure 4A:
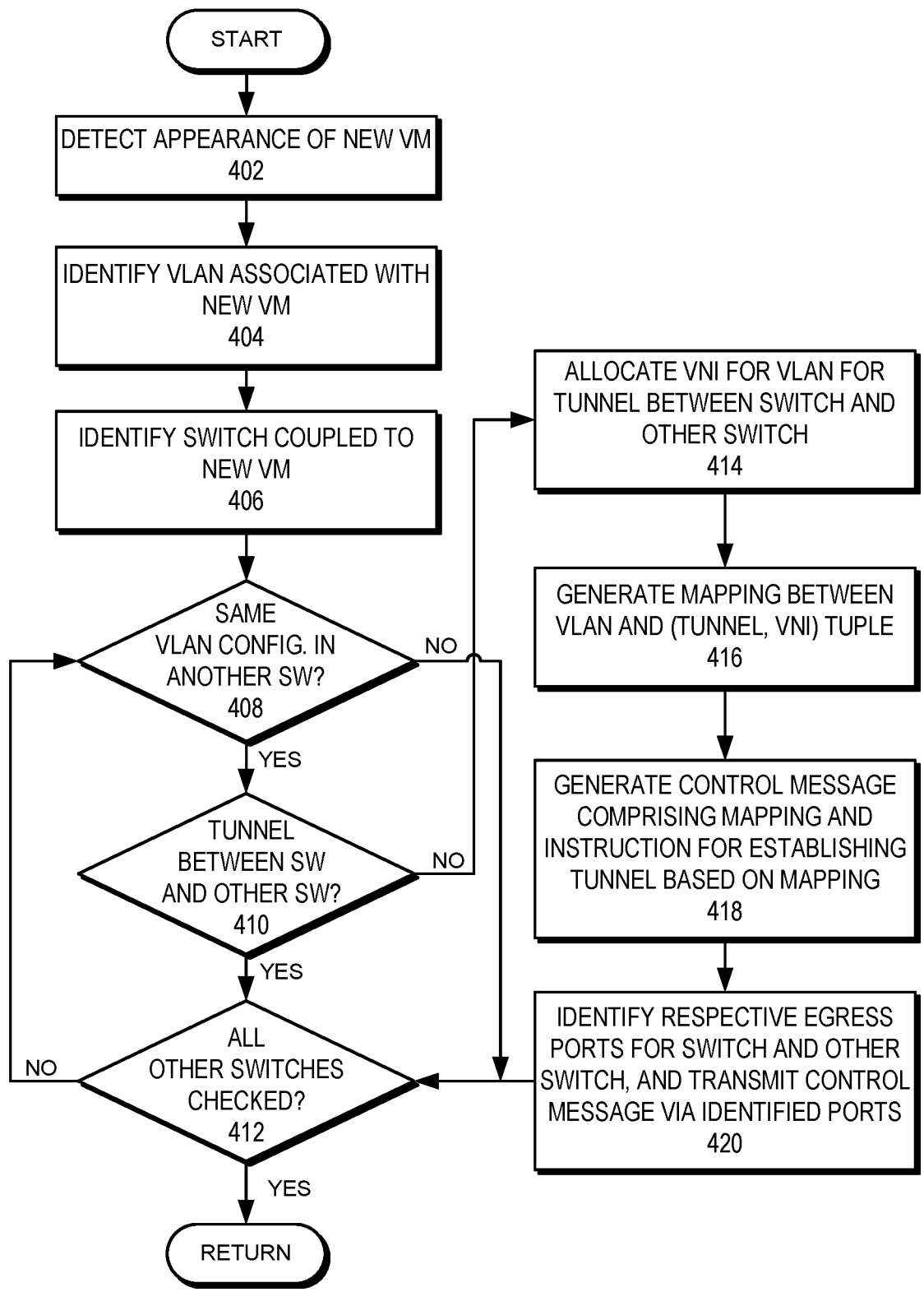
FIG. 4A presents a flowchart illustrating the process of an overlay module establishing an overlay tunnel in response to detecting a new virtual machine, in accordance with an embodiment of the present invention.

FIG. 4A presents a flowchart illustrating the process of an overlay module establishing an overlay tunnel in response to detecting a new virtual machine, in accordance with an embodiment of the present invention. During operation, the overlay module detects the appearance of a new virtual machine (operation 402). The appearance of a new virtual machine can be triggered by migration of a virtual machine from another host machine and creation of a new virtual machine. The overlay module identifies a VLAN (e.g., a layer-2 broadcast domain) associated with the new virtual machine (operation 404). The overlay module then identifies the switch coupled to the new virtual machine (operation 406) and checks whether the same VLAN is configured in another switch (operation 408). If the same VLAN is configured in another switch, the overlay module checks whether a tunnel between the switch and the other switch already exists (operation 410).

If a tunnel between the switch and the other switch doesn't exist, the overlay module allocates a VNI for the VLAN for the tunnel between the switch and the other switch (operation 414). The overlay module generates a mapping between the VLAN and the (tunnel, VNI) tuple (operation 416). The mapping can further include a tenant to which the VLAN belong. The overlay module generates a control message comprising the mapping and an instruction for establishing the tunnel based on the mapping (operation 418). The overlay module then identifies respective egress ports for the switch and the other switch, and transmits the control message via the identified ports (operation 420).

If the overlay module has transmitted the control message (operation 420), the same VLAN is not configured in another switch (operation 408), or a tunnel between the switch and the other switch already exists (operation 410), the overlay module may not create an overlay tunnel for the other switch. It should be noted that the overlay module can allocate a VNI for a VLAN even when the tunnel exists. The overlay module then checks whether all switches have been checked (operation 412). If all switches have not been checked, the overlay module continues to check whether the same VLAN is configured in another switch (operation 408) and whether a tunnel between the switch and the other switch already exists (operation 410).

Figure 4B:
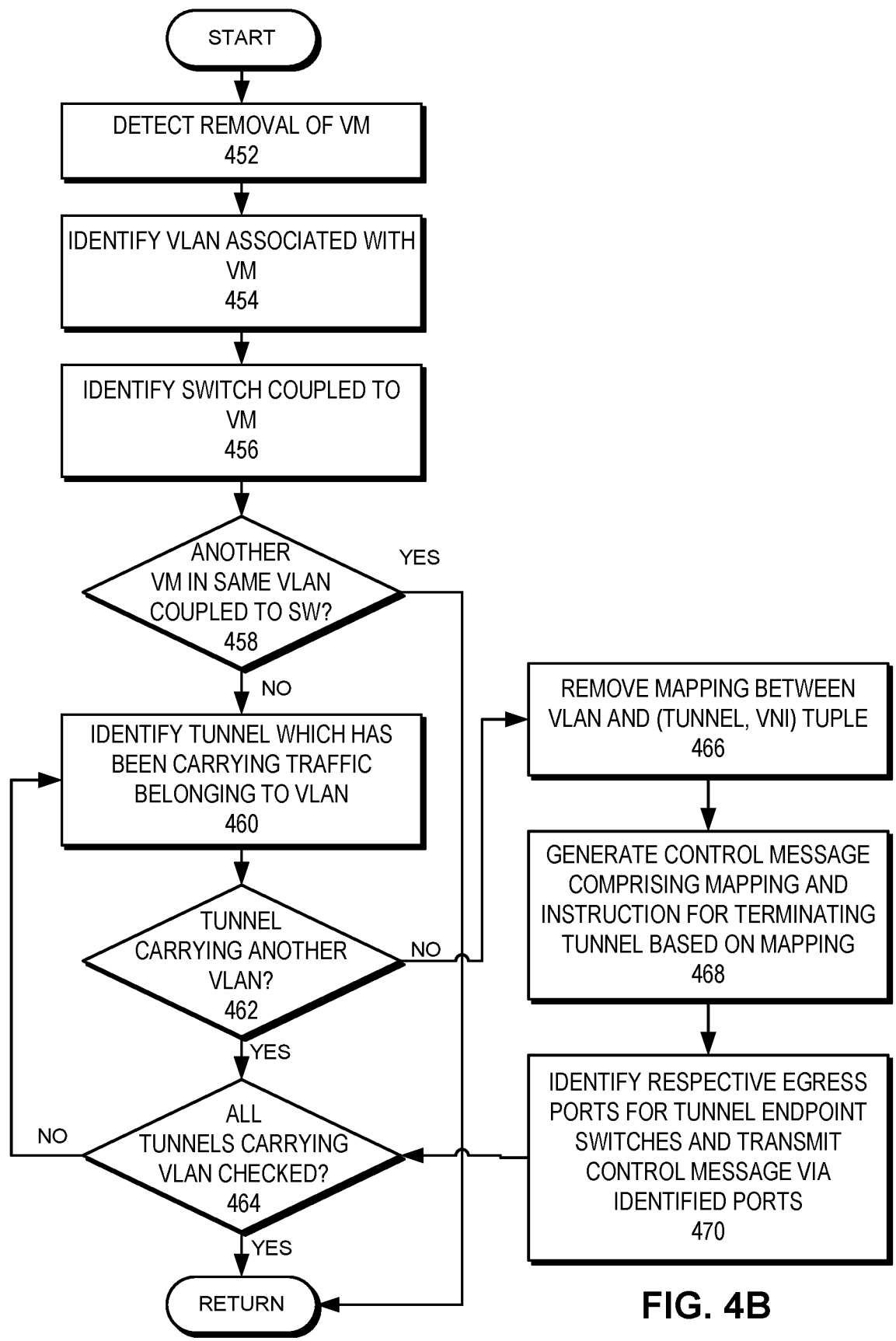
FIG. 4B presents a flowchart illustrating the process of an overlay module terminating an overlay tunnel in response to removal of a virtual machine, in accordance with an embodiment of the present invention.

FIG. 4B presents a flowchart illustrating the process of an overlay module terminating an overlay tunnel in response to removal of a virtual machine, in accordance with an embodiment of the present invention. During operation, the overlay module detects the removal of a virtual machine (operation 452). The removal includes migration and deletion of the virtual machine. The overlay module identifies a VLAN associated with the virtual machine (operation 454). The overlay module then identifies the switch coupled to the new virtual machine (operation 456) and checks whether another virtual machine in the same VLAN is coupled to the switch (operation 458). If another virtual machine in the same VLAN is not coupled to the switch, the overlay module identifies the tunnel which has been carrying traffic of the VLAN (operation 460).

The overlay module checks whether the tunnel carries traffic of another VLAN (operation 462). In this way, the overlay module determines whether the tunnel still provides an overlay service to the tunnel endpoint switches. If the tunnel does not carry traffic of another VLAN, the tunnel can be terminated. The overlay module then removes the mapping between the VLAN and the (tunnel, VNI) tuple (operation 466). The overlay module generates a control message comprising the mapping and an instruction for terminating the tunnel based on the mapping (operation 468). The overlay module then identifies respective egress ports for tunnel endpoint switches and transmits the control message via the identified ports (operation 470).

If another virtual machine in the same VLAN is coupled to the switch (operation 458), the overlay module may not terminate the overlay tunnel. If the overlay module has transmitted the control message (operation 470) or another virtual machine in the same VLAN is coupled to the switch (operation 462), the overlay module checks whether all tunnels carrying the traffic of the VLAN have been checked (operation 464). If all tunnels carrying the traffic of the VLAN have not been checked, the overlay module continues to identify the next tunnel which has been carrying traffic of the VLAN (operation 460).

Operations of a Switch

Figure 5A:
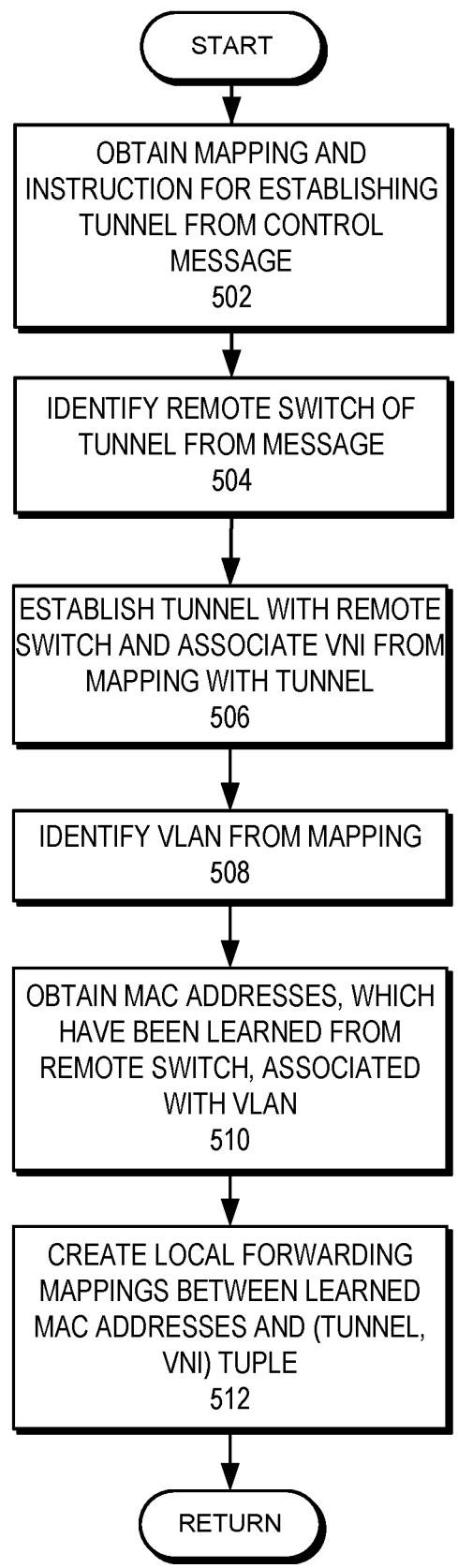
FIG. 5A presents a flowchart illustrating the process of a switch establishing an overlay tunnel, in accordance with an embodiment of the present invention.

FIG. 5A presents a flowchart illustrating the process of a switch establishing an overlay tunnel, in accordance with an embodiment of the present invention. During operation, the switch obtains a mapping and an instruction for establishing a tunnel from a control message (operation 502) and identifies the remote switch of the tunnel (e.g., the IP address of the remote switch) from the message (operation 504). The switch establishes the tunnel with the remote switch and associates the VNI from the mapping with the tunnel (operation 506). The switch identifies the VLAN from the mapping (operation 508) and obtains the MAC addresses, which have been learned from the remote switch, associated with the VLAN (operation 510). The switch then creates a local forwarding mapping between the learned MAC addresses and the (tunnel, VNI) tuple (operation 512).

Figure 5B:
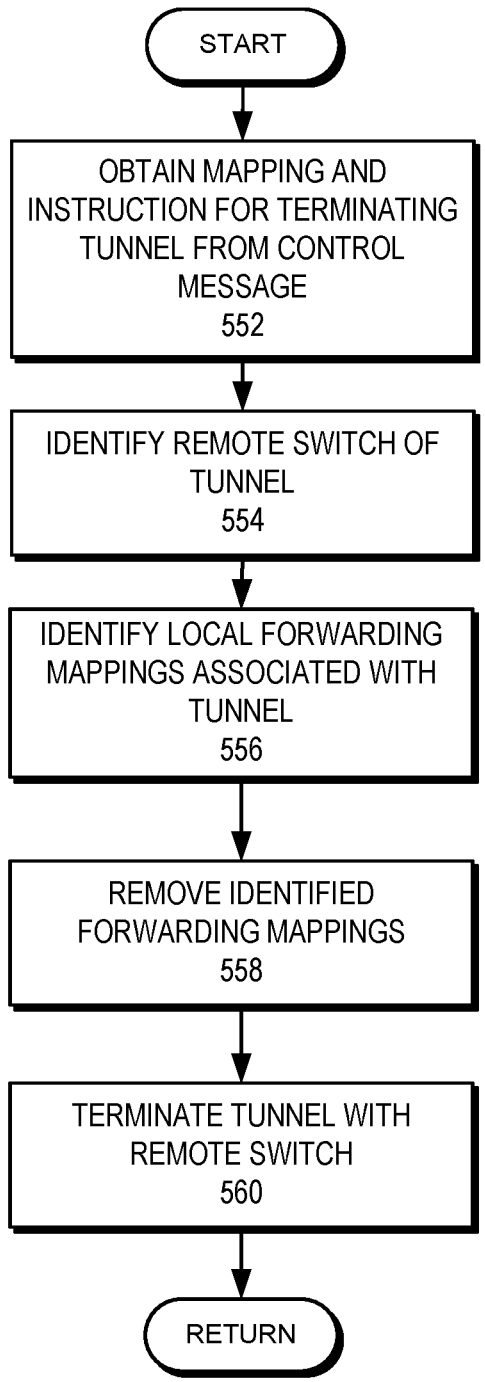
FIG. 5B presents a flowchart illustrating the process of a switch terminating an overlay tunnel, in accordance with an embodiment of the present invention.

FIG. 5B presents a flowchart illustrating the process of a switch terminating an overlay tunnel, in accordance with an embodiment of the present invention. During operation, the switch obtains a mapping and an instruction for terminating a tunnel from a control message (operation 552) and identifies the remote switch of the tunnel from the message (operation 554). The switch identifies the local forwarding mappings associated with the tunnel (operation 556) and removes the identified forwarding mappings (operation 558). The switch then terminates the tunnel with the remote switch (operation 560).

Figure 6:
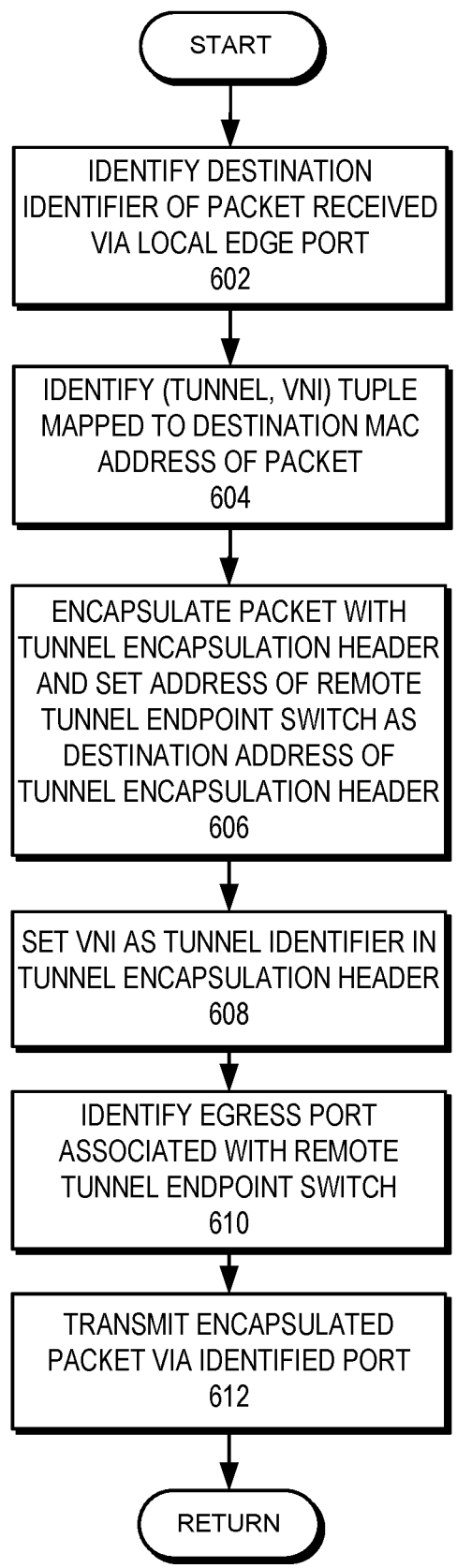
FIG. 6 presents a flowchart illustrating the process of a switch forwarding a packet via an overlay tunnel, in accordance with an embodiment of the present invention.

FIG. 6 presents a flowchart illustrating the process of a switch forwarding a packet via an overlay tunnel, in accordance with an embodiment of the present invention. During operation, the switch identifies the destination identifier of the packet received via a local edge port (operation 602) and identifies the (tunnel, VNI) tuple mapped to the destination MAC address of the packet (operation 604). The switch then encapsulates the packet with a tunnel encapsulation header and sets the address of the remote tunnel endpoint switch as the destination address of the tunnel encapsulation header (operation 606). The switch sets the VNI as the tunnel identifier in the tunnel encapsulation header (operation 608). The switch identifies the egress port associated with the remote tunnel endpoint switch (operation 610) and transmits encapsulated packet via the identified port (operation 612).

Exemplary Computer System and Switch

Figure 7:
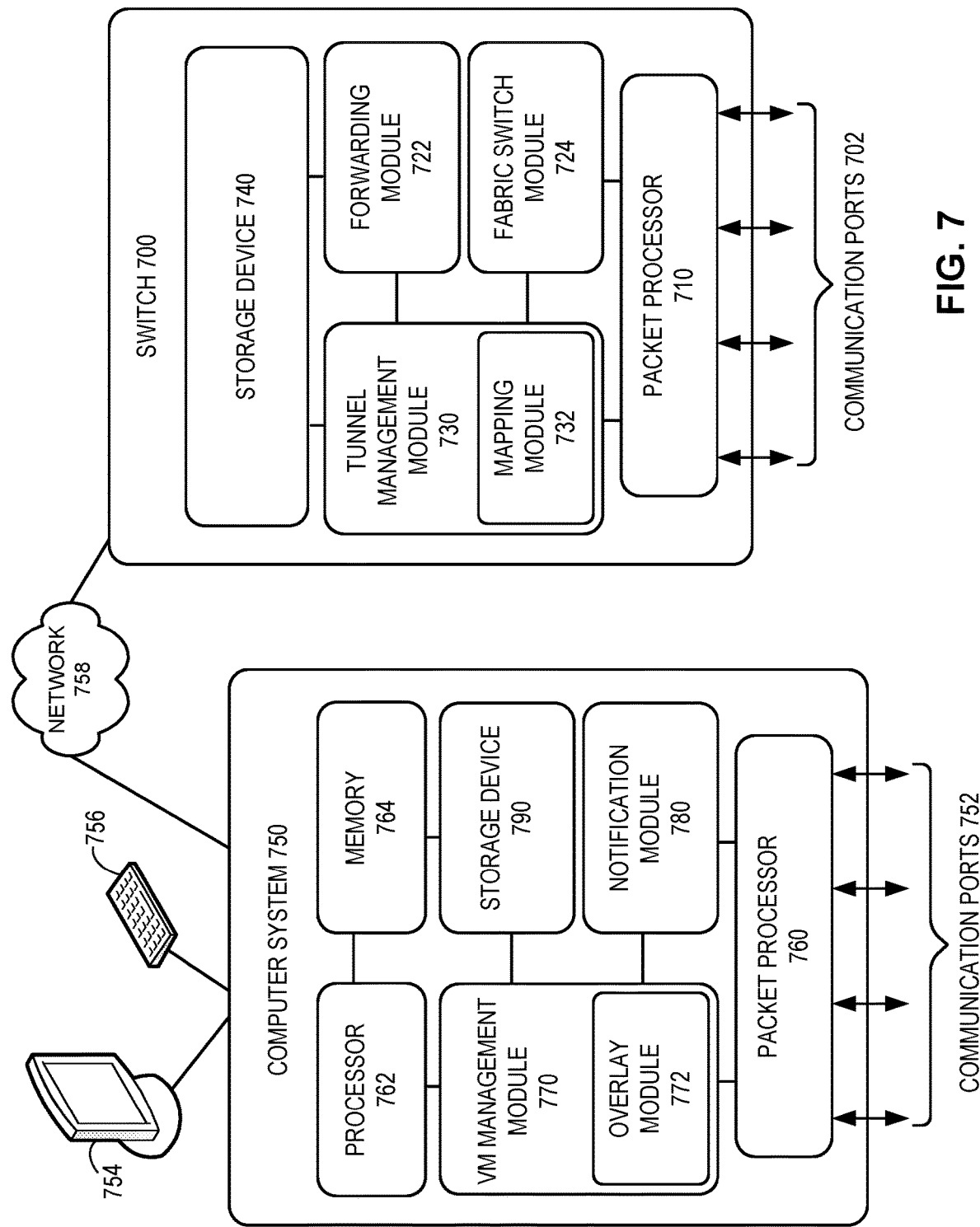
FIG. 7 illustrates an exemplary computer system and an exemplary switch for facilitating dynamic orchestration of overlay tunnels, in accordance with an embodiment of the present invention.

FIG. 7 illustrates an exemplary computer system and an exemplary switch for facilitating dynamic orchestration of overlay tunnels, in accordance with an embodiment of the present invention. In this example, a computer system 750 includes a number of communication ports 752, a processor 762, a memory 764, a packet processor 760, and a storage device 790. Memory 764 can include a volatile memory (e.g., RAM) that serves as a managed memory, and can be used to store one or more memory pools. Memory 764 stores instructions that when executed by processor 762 cause computer system 750 to perform methods and/or processes for facilitating dynamic orchestration of overlay tunnels in network 758, as described in this disclosure. Furthermore, computer system 750 can be coupled to a display device 754 and a keyboard 756.

Computer system 750 further includes a virtual machine management module 770, an overlay module 772, and a notification module 780. During operation, virtual machine management module 770 detects the appearance of a virtual machine running on a hypervisor of a host machine coupled to a switch 700. Virtual machine management module 770 can obtain such information from a notification agent in the hypervisor, as described in conjunction with FIG. 1B. Overlay module 772 identifies a VLAN associated with the virtual machine and determines whether an overlay tunnel exists between switch 700 and a remote switch coupling a another virtual machine belonging to the VLAN. If no such overlay tunnel exists, notification module 780, in conjunction with overlay module 772, generates an instruction for switch 700 and the remote switch to establish an overlay tunnel between the switches. Packet processor 760 forwards the instruction, which can be included in a message, to the switches. On the other hand, if an overlay tunnel exists, overlay module 772 refrains from instructing the switches to establish the overlay tunnel.

Overlay module 772 allocates a network identifier for the VLAN and maintains, in storage device 790, a mapping between the VLAN and a tuple comprising the overlay tunnel (e.g., identified by switch identifiers) and the network identifier. In some embodiments, overlay module 772 detects the removal of the virtual machine from the host machine and determines whether the overlay tunnel provides an overlay service to the switches. If not, overlay module 772 generates an instruction for the switches to terminate the overlay tunnel.

In some embodiments, switch 700 includes a fabric switch module 724, which maintains a membership in a network of interconnected switches. A respective switch of the network is associated with a group identifier identifying the network. Switch 700 then maintains a configuration database in a storage device 740 that maintains the configuration state of a respective switch within the fabric switch. Switch 700 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format (e.g., a TRILL or IP protocol).

In this example, switch 700 further includes a number of communication ports 702, a packet processor 710, a tunnel management module 730, a mapping module 730, a forwarding module 722, and a storage device 740. Tunnel management module 730 establishes an overlay tunnel with a remote switch based on an instruction for establishing the tunnel. Mapping module 730 maintains, in storage device 740, a mapping between a first tuple and a second tuple. The first tuple includes a MAC address and a VLAN identifier of a virtual machine. The second tuple includes the overlay tunnel and a network identifier.

Forwarding module 722 encapsulates a packet in a tunnel encapsulation header associated with the overlay tunnel based on the mapping. In some embodiments, packet processor 710 determines an egress port from communication ports 702 based on the destination address of the encapsulated packet and transmits the encapsulated packet via the egress port. Tunnel management module 730 terminates the overlay tunnel based on another instruction for terminating the tunnel.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch, a system, and a method for facilitating dynamic overlay tunnel orchestration. In one embodiment, the system detects the appearance of a first virtual machine running on a hypervisor of a first host machine coupled to a first switch in a network. The system identifies a VLAN associated with the first virtual machine and determines whether an overlay tunnel exists between the first switch and a second switch coupling a second virtual machine belonging to the first VLAN. If no such overlay tunnel exists, the system generates an instruction for the first and second switches to establish a first overlay tunnel between the first and second switches.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing system, comprising:
a processor; and
a memory storing instructions that when executed by the processor cause the system to perform a method, the method comprising:
detecting appearance of a first virtual machine running on a hypervisor of a first host machine reachable via a first switch in a network of interconnected switches by obtaining information indicating the appearance of the first virtual machine from a notification message from a notification agent of the hypervisor on which the first virtual machine runs and detecting the appearance in accordance with the information indicating the appearance;
identifying a first virtual local area network (VLAN) to which the first virtual machine belongs;
identifying, in the network of interconnected switches, a second switch via which a second virtual machine belonging to the first VLAN is reachable;
determining whether an overlay tunnel currently exists between the first switch and the second switch; and
in response to determining that no overlay tunnel currently exists between the first and second switches, generating an instruction for the first and second switches to establish a first overlay tunnel between the first and second switches, and managing and maintaining the first overlay tunnel by the first switch and the second switch, including packet encapsulation performed at the first switch and second switch.

2. The computing system of claim 1, wherein the method further comprises allocating a network identifier for the first VLAN, wherein the network identifier indicates traffic belonging to the first VLAN in the first overlay tunnel.

3. The computing system of claim 2, wherein the method further comprises maintaining a mapping between a VLAN identifier of the first VLAN and a tuple comprising a tunnel identifier of the first overlay tunnel and the network identifier.

4. The computing system of claim 1, wherein the method further comprises refraining from instructing the first and second switches to establish the first overlay tunnel in response to determining that an overlay tunnel currently exists between the first and second switches.

5. The computing system of claim 1, wherein the method further comprises:
  detecting that the first virtual machine is no longer reachable via the first switch;
  determining whether the first overlay tunnel provides an overlay service to the first and second switches;
  in response to determining that the first overlay tunnel does not provide an overlay service, generating an instruction for the first and second switches to terminate the first overlay tunnel between the first and second switches.

6. The computing system of claim 5, wherein determining whether the first overlay tunnel provides an overlay service to the first and second switches comprises one or more of:
  determining whether the first overlay tunnel carries traffic belonging to a second VLAN; and
  determining whether a third virtual machine belonging to the first VLAN is reachable via the first switch.

7. The computing system of claim 5, wherein the first virtual machine has been removed from the first host machine based on one of:
  a migration of the first virtual machine from the first host machine; and
  a deletion of the first virtual machine from the first host machine.

8. A computer-executable method, comprising:
  detecting appearance of a first virtual machine running on a hypervisor of a first host machine reachable via a first switch in a network of interconnected switches by obtaining information indicating the appearance of the first virtual machine from a notification message from a notification agent of the hypervisor on which the first virtual machine runs and detecting the appearance in accordance with the information indicating the appearance;
  identifying a first virtual local area network (VLAN) to which the first virtual machine belongs;
  identifying, in the network of interconnected switches, a second switch via which a second virtual machine belonging to the first VLAN is reachable;
  determining whether an overlay tunnel currently exists between the first switch and the second switch; and
  in response to determining that no overlay tunnel currently exists between the first and second switches, generating an instruction for the first and second switches to establish a first overlay tunnel between the first and second switches, and managing and maintaining the first overlay tunnel by the first switch and the second switch, including packet encapsulation performed at the first switch and second switch.

9. The method of claim 8, further comprising allocating a network identifier for the first VLAN, wherein the network identifier indicates traffic belonging to the first VLAN in the first overlay tunnel.

10. The method of claim 9, further comprising maintaining a mapping between a VLAN identifier of the first VLAN and a tuple comprising a tunnel identifier of the first overlay tunnel and the network identifier.

11. The method of claim 8, further comprising refraining from instructing the first and second switches to establish the first overlay tunnel in response to determining that an overlay tunnel currently exists between the first and second switches.

12. The method of claim 8, further comprising:
  detecting that the first virtual machine is no longer reachable via the first switch;
  determining whether the first overlay tunnel provides an overlay service to the first and second switches;
  in response to determining that the first overlay tunnel does not provide an overlay service, generating an instruction for the first and second switches to terminate the first overlay tunnel between the first and second switches.

13. The method of claim 12, wherein determining whether the first overlay tunnel provides an overlay service to the first and second switches comprises one or more of:
  determining whether the first overlay tunnel carries traffic belonging to a second VLAN; and
  determining whether a third virtual machine belonging to the first VLAN is reachable via the first switch.

14. The method of claim 12, wherein the first virtual machine has been removed from the first host machine based on one of:
  a migration of the first virtual machine from the first host machine; and
  a deletion of the first virtual machine from the first host machine.

15. A switch, comprising:
  tunnel circuitry configured to establish an overlay tunnel with a second switch based on a first instruction identifying tunnel endpoint switches of the overlay tunnel, wherein a first virtual machine is reachable via the switch and a second virtual machine is reachable via the second switch, and wherein the first and second virtual machines belong to a first virtual local area network (VLAN), in response to information indicating an appearance of the first virtual machine running on a hypervisor of a first host machine from a notification message from a notification agent of the hypervisor on which the first virtual machine runs; and
  mapping circuitry configured to maintain, in a storage device, a mapping between a first tuple and a second tuple, wherein the first tuple comprises a media access control (MAC) address of the second virtual machine and a VLAN identifier of the first VLAN, wherein the second tuple comprises an tunnel identifier of the overlay tunnel and a network identifier, and wherein the network identifier indicates traffic belonging to the VLAN in the overlay tunnel, wherein the tunnel circuitry in cooperation with the second switch manage and maintain the overlay tunnel and provide packet encapsulation.

16. The switch of claim 15, wherein the first instruction further comprises the VLAN identifier, the overlay tunnel, and the network identifier.

17. The switch of claim 15, further comprising forwarding circuitry configured to encapsulate a packet in a tunnel encapsulation header associated with the overlay tunnel based on the mapping, wherein the tunnel encapsulation header includes the network identifier.

18. The switch of claim 15, wherein the tunnel circuitry is further configured to terminate the overlay tunnel with the second switch based on a second instruction that identifies tunnel endpoint switches for the overlay tunnel.

* * * * *